Figure 5:
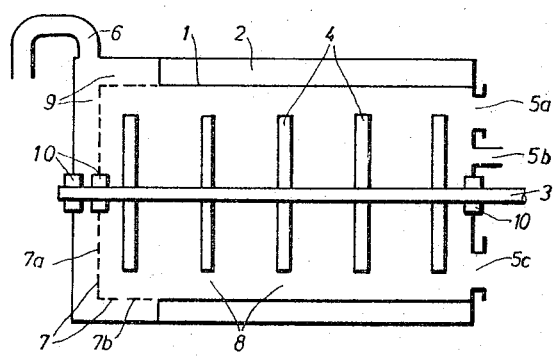

March 14, 1967  H. H. MÖLLS ETAL  3,309,030
PROCESS AND DEVICE FOR THE CONTINUOUS
PRODUCTION OF DISPERSIONS
Filed Dec. 29, 1964  2 Sheets-Sheet 1
FIG. 1
FIG. 2
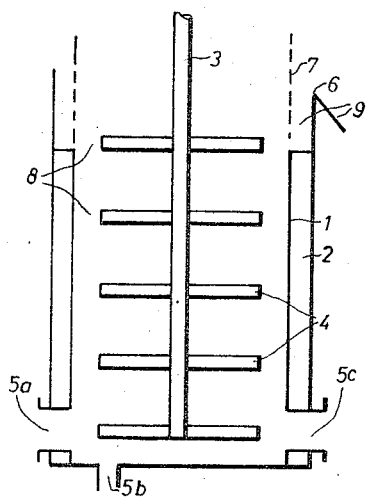
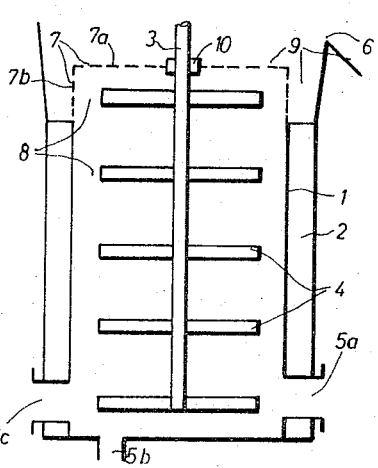
FIG. 3
FIG. 4
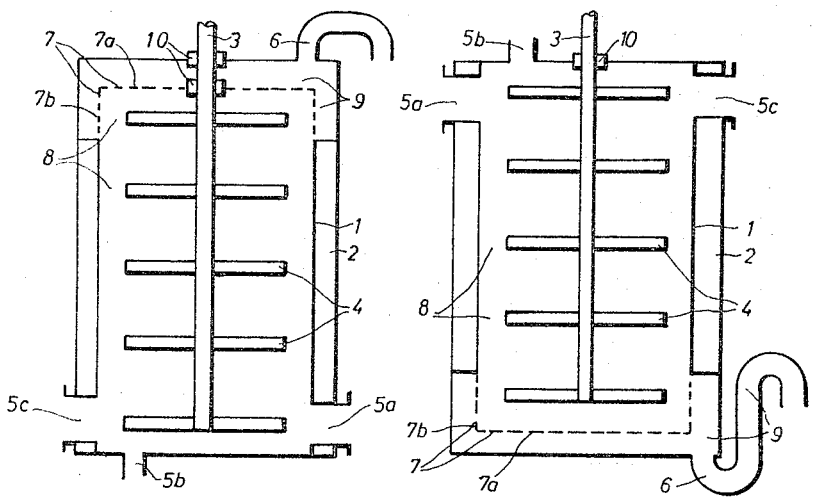
INVENTORS:
HANS HEINZ MÖLLS, REINHOLD HÖRNLE, HANS RAAB, FRANZ BECHLARS, GÜNTHER STEINMETZ.
BY
Berger, Dinklage & Sprung
ATTORNEY United States Patent Office 3,309,030
Patented Mar. 14, 1967

3,309,030
PROCESS AND DEVICE FOR THE CONTINUOUS
PRODUCTION OF DISPERSIONS
Hans Heinz Mölls and Reinhold Hörnle, Cologne-Flittard, Hans Raab, Cologne-Stammheim, Franz Bechlars, Leverkusen-Schlebusch, and Günther Steinmetz, Cologne-Stammheim, Germany, assignors to Farbenfabriken Bayer Aktiengesellschaft, Leverkusen, Germany, a corporation of Germany
Filed Dec. 29, 1964, Ser. No. 421,976
Claims priority, application Germany, Jan. 22, 1964, F 41,803
11 Claims. (Cl. 241—21)

This invention relates to an improved process for the continuous preparation of dispersions from solids and liquid media and an apparatus suitable for carrying out the process. More particularly it relates to improvements in the process of fine grinding and an apparatus therefor.

It is a feature common to a large number of continuous processes for the wet subdivision of solid agglomerates or crystals in liquids wherein the solids are hardly soluble, that a suspension of the more or less coarse particles of the solids in the respective liquid is pumped through a strongly agitated layer of fine grinding elements whose mean diameter is less than 10 mm. Before it is discharged, the fine dispersion of the solids is separated from the grinding elements, in general by means of a sieve, and it is then run off (cf., for instance, German patent specification No. 589,796 and German published specification No. 1,109,988, U.S.A. patent specification No. 2,581,414 and British patent specification No. 909,609).

Although the forms of execution of these processes differ widely, the solids are nevertheless always introduced into the grinding vesssel by pumping them there in the form of a suspension so that a certain capacity for flow of the suspension is a prerequisite condition. This condition involves additional expenditure during the known processes, since the preparation of a suspension which is capable of transfer by pumping has to be carried out in an additional apparatus (preliminary mixer). The continuous processes of subdivision will therefore often have to be coupled with a discontinuous operation for the suspension of the solids in the liquids, because a large number of solids can only be stirred into the liquids at a slow rate when the latter wet them poorly so that there is a tendency for lump formation. The need for employing appropriately large preliminary mixers then leads to particular expense during the application of continuous methods of subdivision.

In some cases, it will not prove possible to carry out processes of this type at all, for instance during the preparation of aqueous dispersions of pigments at a higher concentration, because there is only very incomplete wetting of the solids even in preliminary mixers with an extremely good efficiency and because of the related fact that the suspensions are capable of a sufficiently trouble-free transfer by pumping for their envisaged purpose of application only at relatively low concentrations of the solids in the liquids, which are not of technical interest. The problem would be solved by the provision of a technically useful process for the continuous suspension of substances which are imperfectly wetted.

It is a principal object of this invention to provide a simple and efficient process for preparing a dispersion having a finely divided state by suspending and subdividing a solid in a liquid medium in an enclosed system. This process comprises passing in continuously under pressure the solid being in a non-pumpable state and simultaneously the liquid medium in an agitated layer of spherical grinding elements having a particle diameter in the range of 0.3 to about 10 mm., passing thru said agitated layer the solid together with the liquid medium and separating continuously the formed dispersion from the grinding elements of said agitated layer. Non-pumpable state of the solid means that the solid may be dry or combined with the liquid medium resp. a part of the liquid medium in form of a press cake.

A further object of this invention is to carry out the process in the presence of a surface active agent or wetting agent. This surface active agent may be added together with the liquid medium, the surface active agent being soluted therein or together with the dry solid said dry solid containing the surface active agent in pulverized form. Furthermore the surface active agent may be added to the press cakes consisting of the solid and the liquid medium. The formed dispersion may be separated off from the grinding elements of the agitated layer by the aid of a sieve.

It has now been unexpectedly found that a suitable modification of the known processes for subdivision will also permit the preparation during a single continuous operation of a suspension of solids or of those of their mixtures with liquids which cannot be transferred by pumping. The novel process which is the object of the present invention in addition represents an extremely efficient method for the suspension of solids whose wetting characteristics are particularly poor, such as carbon black, even when it is not really necessary to subdivide the solids at the same time.

The novel process consists in that the dry solids are added under pressure at one location in a suitable vessel to an agitated layer of rounded solid grinding elements, for instance those of material containing silicon dioxide, salts or metals, metal oxides, metal carbides or plastics and having a particle diameter in the range of 0.3 to 10 mm., and that at another appropriate place the amount of the dispersion agent required for suspending the solids is added at the same time optionally under pressure, where the dry solid and/or the charged dispersion agent may contain a surface active material (tenside); the dispersion of the grinding stock formed during the grinding operation is continuously separated from the grinding elements, preferably by means of a sieve, at a position which is located as far as possible from the place where the solid matter enters, so that the ratio of the volume of the grinding elements to the volume of the dispersion of the solid is kept constant as far as possible during its passage.

According to a modification of the process, it is also possible to introduce mixtures of solids with liquids which cannot be transferred by pumping in lieu of the dry solids so that a supply of dispersion agents for the suspension of the grinding stock can be wholly or partly dispensed with and that it will merely be necessary to provide for the separate addition of a surface active agent where necessary.

The terms "grinding stock," "dispersion agent," "dispersion of the grinding stock," "grinding elements' 'and "grinding mixture" are in this connection applied according to the following definitions: The "grinding stock" is the solid to be dispersed or suspended; the "dispersion agent" (dispersion medium) is the liquid in which the material is dispersed; the "dispersion of the grinding stock" is the dispersion of the grinding stock in the dispersion agent which may possibly also contain surface active agents; the "grinding elements" are rounded substances which bring about the suspension and dispersion; the "grinding mixture" is the mixture of the dispersion of the grinding stock with the grinding elements.

The invention will be further described in connection with the drawings which show more particularly an enclosed system designed for carrying out the process.

The designs reproduced diagrammatically in FIGURES 1–5 are preferably employed as the suspension and subdivision devices charged with the fine grinding elements which operate continuously according to the invention.

In FIGURES 1–5, 1 represents a cylindrical grinding vessel which is surrounded by a cooling or heating jacket 2; a shaft 3 carrying the mixing elements 4, drawn in the form of discs in the given case, extends concentrically into the grinding vessel. An inlet 5a for charging the grinding stock present in the form of powder or for charging a mixture of the grinding stock with the dispersion agent which cannot be transferred by pumping is provided on or near the bottom of the grinding vessel, as well as an inlet 5b for charging the dispersion agent which can be pumped and/or an inlet 5c for charging the powdered surface active agent. The construction of the charge inlets is such that they can be closed when they are not required. The discharge outlet 6, or overflow in the case of FIG. 1 and FIG. 2, is provided beyond a sieve, in relation to the position of the grinding mixture, and this is preferably adjoining the free side of the grinding vessel so that it as as far as possible from the inlet 5a, b, c for charging the substances to be mixed or ground. The design of the sieve 7 in FIGURES 2–5 may be modified in that the part of the sieve which is either vertical 7a to the shaft 3 or parallel 7b with it is replaced by a compact surface when in the second case the cooling jacket 2 is raised up to the level of the sieve 7a. The mesh width of the sieve has to be selected so that the smallest employed grinding elements are just prevented from passing through it. In the case of the design according to FIG. 2, the upper side of the overflow 6 should preferably be at a level of at least 3 cm. above the extremity of the sieve. The inner surfaces of the grinding vessel 1 and of the sieve 7 enclose the grinding space 8, although the construction according to FIG. 1 constitutes an exception since the horizontal plane extending from the upper edge of the overflow represents the upper limit of the grinding space in this non-enclosed system. The grinding space and where required the external surfaces are sealed by means of seals 10 at the locations where the shaft 3 penetrates through them, and these may also act as bearings. The seal 10 may for instance be of rubber, metal, graphite, plastics or sealing liquid, and in the last case the dispersion of the grinding stock rising above the upper surface of the sieve 7a may also act as the seal, as may the grinding mixture itself in a suitable construction, for instance if a sieve or tube is passed round the shaft.

The grinding elements are preferably agitated by stirring (rotation) or by vibration.

When the agitation is effected by stirring, the free grinding space contains 10 to 70, and preferably 40 to 60, percent by volume of the grinding elements, referred to the volume of solids; mixing elements suitable at a low number of revolutions (circumferential speeds of 1–4 m./sec.) are described in Ullman "Encyclopädie der technischen Chemie" (Urban und Schwarzenberg Verlag, Munich-Berlin), 3rd edition, volume I, page 707. Owing to the risk of abrasion and the possibility that the grinding elements may be destroyed, only plane crossed blades, stirring rods preferably with a stream line cross section, screws and special flat or conical compact or perforated circular discs or rings connected to the shaft by spokes are suitable at circumferential speeds greater than 4m./sec. The circular discs or rings should be attached vertically to the stirrer shaft and the shaft should pass through their centre. In the case where several mixing elements are employed, they should be spaced at a distance of between their half and their full radii in their attachment to the stirrer shaft. The circumferential speeds should be between 4 and 20 m./sec., preferably between 7 and 13 m./sec. The distance between the mixing elements and the grinding vessel always depends on the diameter of the grinding elements and should amount to between 3 and 30 times the diameter of the grinding elements.

When the agitation of the griding elements is effected by vibration, the free grinding space contains 10 to 50, and preferably 15 to 40 percent by volume of the grinding elements, referred to the volume of solids, and use is made of the stirrer plated normally encountered in vibro mixers (cf. Ullmann "Encyclopädie der technischen Chemie," Urban und Schwarzenberg Verlag, Munich-Berlin, 3rd edition, volume I, page 702) where the diameter of the conical apertures at the narrowest point in the stirred plates should amount to between 4 and 16 times the mean diameter of the grinding elements. The stirrer plates should be attached vertically to the shaft and arranged so that they are spaced at a distance of between their quarter and their full radii, with the wide ends of the conical apertures pointing towards the discharge outlet, i.e. their effect opposes the direction of the throughput. During the operation, the stirrer plates should preferably move at a frequency of 50–100 cycles/sec. and an amplitude of a 2–3 mm. The distance between the mixing elements and the grinding vessel once again depends on the diameter of the grinding elements in each case and generally amounts to between 3 and 10 times the diameter of the grinding elements.

The grinding elements can also be moved through the vessel by imparting the appropriate frequencies to them.

Materials which cannot be transferred by pumping, such as powered grinding stock, powdered surface active agents or mixtures thereof, and also those mixtures of the grinding stock with dispersion agents which cannot be transferred by pumping, are introduced into the grinding space 8 under pressure through the charge inlets 5a or 5c by means of the conveyor devices normally employed for materials of this type, for instance with conveyor belts but preferably with the aid of screw conveyors or screw extruders with one or several screw channels.

The dispersion agent which is capable of transfer by pumping and which may optionally contain a surface active agent as a true or colloidal solution is introduced under pressure through the charge inlet 5b by means of a liquid pump or under hydrostatic pressure.

The proportioning of the amounts of the grinding stock, the dispersion agent and optionally the surface active agent which are introduced at the same time into the grinding space is adjusted so that the desired composition of the suspension is formed when care has to be taken that the amounts of the individual components are adapted to the conditions in the device and to the viscosity of the resulting dispersion of the grinding stock during processing. The viscosity should not exceed 10,000 centipoises and preferably have a value of up to 1000 centipoises.

Spherical or rounded elements of size 0.3 to 10 mm. are utilized as the grinding elements, when the selected order of magnitude is adapted to the dimensions of the employed grinding stock in a given case.

The grinding elements should be hardly soluble or insoluble in the dispersion agent. Suitable materials are substances containing silicon dioxide such as, for instance, quartz, any type of sand, river gravel and flint as well as glass and ceramic compositions such as porcelain and steatite and other sintered metal silicates such as aluminum silicate. Iron and iron alloys are particularly suitable examples of metallic substances, but also other hard metals and their alloys as well as metal salts and metal oxides, and among the latter aluminum oxide, either sintered or in the form of corundum, has proved to be especially useful. Stable carbides such as silicon carbide, and organic plastics such as polyolefins, polyvinyl chloride, polystyrene, polymethacrylate esters, polyamides, aromatic polyesters, polyurethanes and polycarbonates, as well as copolymers of divinylbenzene with methyl acrylate and other unsaturated compounds are also suitable for this purpose.

The following may, inter alia, be mentioned as examples of grinding stocks (solids to be dispersed or suspended) which are moderately or hardly soluble or insoluble in the dispersion agent employed in a given case: inorganic solids such as the elements sulphur, phosphorus and carbon (carbon black, graphite), and also oxides and salts such as the inorganic pigments iron oxide, titanium dioxide and cadmium sulphide, as well as organic substances such as intermediate products, organic pest control agents and plate protection agents, organic pharmaceuticals and others. The process is of special interest for the dispersion of organic dyestuffs such as pigments, dispersion dyestuffs and vat dyestuffs, as well as of organic whitener.

All liquids which can be transferred by pumping may be considered for application as the dispersion agents, for instance water and aqueous solutions of salts, alkalis and acids, organic solvents such as aromatic or aliphatic hydrocarbons, alcohols, phenols, ketones, ethers, amines, organic acids and their functional derivatives such as amides and esters, and oils, as well as film forming material, optionally diluted with organic solvents.

Any kind of non-ionic, anionic, cationic or betaine type dispersing agent may be employed as the surface active agent, such as are for instance listed in the chapter on emulsifying agents in Houben-Weyl: "Methoden der organischen Chemie" (Georg Thieme Verlag, Stuttgart), volume I/2, pages 113–139.

Apart from the advantages of the novel process which have already been mentioned, and in particular its completely continuous sequence of operations which contrasts sharply with the present state of technical knowledge, the procedure also offers other advantages; its adoption will for instance make possible the processing of solids which are only wetted with difficulty. In addition those products whose suspensions cannot normally be transferred by pumping owing to their thixotropic properties can also be processed. It is also possible to improve the processing of those dispersions whose composition causes strong foaming to occur in the normal suspension devices.

Devices whose construction is in accordance with FIGURES 1–5 are for instance employed for the continuous suspension and further dispersion of the grinding stock in the following examples, where the mixing elements 4 are plane circular discs and the shaft 3 rotates at a rate of 1000 revolution/min. Cold water is passed through the cooling jacket 2. The grinding vessel 1 has a height of 100 cm. and a diameter of 26 cm. (internal dimensions) and the discs have a diameter of 21 cm. and a thickness of 1 cm. The disc next to the charge inlets is spaced 5 cm. from the bottom, the disc next to the discharge outlet is at the level of the lower edge of the sieve 7 or 7b, and another 9 discs are attached between these two extreme discs so that they are spaced at equal distances from each other. When the construction is in accordance with FIGURE 1, the sieve 7 has a height of 20 cm. and when the constructions are in accordance with FIGURES 2–5, the sieve 7b adjoining the grinding vessel has a height of 4 cm. The grinding vessel contains 67 kg. of the grinding elements of the type and dimensions specified in the individual examples.

The charge inlet 5a, b, c which is not required is shut before the grinding elements are introduced and is kept closed whilst the mill is in operation. Where required, conveyor screws such as have for instance been described in "Fortschritte der Verfahrenstechnik," volume 2 (1954/1955), page 512 (Verlag Chemie G.m.b.H., Weinheim/Bergstrasse) are fitted to the charge inlet 5a and 5c so that the zones of contact between a charge inlet and the housing of the conveyor screws are sealed.

Where necessary, the charge inlet 5b is connected to a liquid pump.

The devices which may be employed for the execution of the process according to the invention are by no means limited to the devices described above. Different constructions may, for instance, be derived from the general description.

The following examples are given for the purpose of illustrating the invention.

*Example 1*

The described devices according to FIGURES 1–5 were fitted with sieves of a mesh width of 0.3 mm. and they contain glass balls of the dimensions 0.4 to 0.8 mm. as the grinding elements. 140 kg. of flowers of sulphur, having a particle distribution of crystals with a major fraction of mean diameter 30–60$\mu$, larger fractions of mean diameter 10–30$\mu$ and 60–80$\mu$, and small fractions of mean diameter 3–10$\mu$ and 80–100$\mu$ are introduced uniformly during one hour into these devices, whilst they are in operation, through the charge inlets 5a with the aid of metering screws; at the same time 120 kg. of a 25% aqueous solution of the sodium salt of dinaphthylmethane-2,2'-disulphonic acid are in each case pumped in through the charge inlets 5b. In the resultant homogeneous dispersions of the grinding stock, which is capable of flow, the sulphur contained at a proportion of 53.7% is present with a particle distribution having a main fraction of 5–8$\mu$ as well as large fractions of 1–5$\mu$ and 8–12$\mu$ and also small fractions of 0.5–1$\mu$ and 12–16$\mu$ (the $\mu$ data refer to the mean diameter).

*Example 2*

The described devices according to FIGURES 1–5 were fitted with sieves of a mesh width of 0.25 mm. and they contain glass balls with a diameter of 0.3 to 0.7 mm. as the grinding elements. 38 kg. of carbon black are introduced uniformly during one hour into these devices, whilst they are in operation, through the charge inlets 5a with the aid of metering screw conveyors. At the same time, 82 kg. of a 4.6% aqueous dispersion of the sodium salt of dinaphthylmethane-2,2'-disulphonic acid are in each case pumped in through the charge inlets 5b. In the resultant homogeneous dispersions of carbon black, which are capable of flow, the carbon black contained at a proportion of 32 percent by weight is present in a state of fine subdivision of less than 4$\mu$.

*Example 3*

The described devices according to FIGURES 2–5 were fitted with sieves of a mesh width of 0.3 mm. and they contain Ottawa sand with a diameter of 0.4 to 0.8 mm. as the grinding elements. 40 kg. of the powdered pigment dyestuff C.I. Pigment Red 112 (Colour Index, 2nd edition, vol. 3, No. 12,370) are introduced uniformly during one hour into these devices, whilst they are in operation, through the charge inlets 5a with the aid of metering screw conveyors. At the same time, 60 kg. of an aqueous solution containing 20% by weight of the reaction product of 1 mole of hydroxydiphenyl and 1 mole of benzyl chloride to which 12–14 moles of ethylene oxide have on average been added per mole, are in each case pumped in through the charge inlets 5b. In the resultant homogeneous dispersions of the pigment, which are capable of flow, the pigment contained at a proportion of 40 percent by weight is present in a state of fine subdivision of less than 15$\mu$.

When in this example, the reaction product of hydroxydiphenyl, benzyl chloride and ethylene oxide is replaced by the use as the tenside of equivalent amounts of alkali metal salts of fatty acids, alkali metal salts of alkylsulphonic acids, alkali metal salts of alkylaryl-sulphonic acids, alkali metal salts of aliphatic esters of sulphuric acid and higher molecular weight alkylene oxide addition products with aromatic or araliphatic or aliphatic carboxylic acids, alcohols, amines or mercaptans, very good results are again obtained.

Example 4

The described devices according to FIGURES 1–5 were fitted with sieves of a mesh width of 0.3 mm. and they contain glass balls with a diameter of 0.4 to 0.7 mm. as the grinding elements. 80 kg. of titanium dioxide pigment (rutile) are introduced uniformly during one hour into each of these devices, whilst they are in operation, through the charge inlets 5a with the aid of metering screw conveyors. At the same time, 60 kg. of a 50% solution of a long oil drying alkyd resin in white spirits are in each case pumped in through the charge inlets 5b. After it has passed through, the ground mixture is treated with a solution of a long oil drying alkyd resin in white spirits and cobalt-lead naphthenate drier. A thin film coat of the varnish exhibits a high gloss after it has dried.

Example 5

The described devices according to FIGURES 1–5 were fitted with sieves of a mesh width of 0.25 mm. and they contain glass balls with a diameter of 0.35–0.7 mm. as the grinding elements. 80 kg. of titanium dioxide pigment (rutile) are introduced uniformly during one hour into each of these devices, whilst they are in operation, through the charge inlets 5a with the aid of metering screw conveyors. At the same time, 60 kg. of a 30% solution in xylene of an alkyd resin based on dehydrated ricinoleic acid and having an oil content of 40% are in each case pumped in through the charge inlets 5b. When the ground mixture has been treated with further amounts of the above alkyd resin as well as with melamine-formaldehyde resin and with a solvent mixture of 1 part of the benzyl ester of glycollic acid and 4 parts of ethylene glycol, a stoving varnish is obtained which exhibits a high gloss after a thin film of it has been baked at 120° C.

Example 6

The described devices according to FIGURES 1–5 were fitted with sieves of a mesh width of 0.7 mm. and they contain either river gravel or alluvial sand with a diameter of 1 to 2 mm. as the grinding elements. 100 kg. of flowers of sulphur (coarse fraction up to $100\mu$) are introduced uniformly during one hour into these devices, whilst they are in operation, through the charge inlets 5a with the aid of metering screw conveyors; at the same time, 20 kg. of sodium dinaphthylmethane-2,2′-disulphonate are in each case introduced through the charge inlets 5c with the aid of metering screw conveyors and 80 l. of water are simultaneously pumped in through the charge inlets 5b. In the resultant homogeneous dispersions of sulphur, which are capable of flow, the sulphur contained at a proportion of 50% is present in a state of subdivision of less than $25\mu$.

Example 7

The described devices according to FIGURES 2–5 were fitted with sieves of a mesh width of 0.3 mm. and they contain glass balls with a diameter of 0.4 to 0.9 mm. as the grinding elements. 150 kg. of a compressed filter cake containing 28% by weight of copper phthalocyanine in the α-modification (prepared according to the process of German Patent No. 1,136,303) are introduced uniformly during one hour into each of these devices, whilst they are in operation, through the charge inlets 5a with the aid of metering screw conveyors. At the same time, 8 kg. of the sodium salt of lignin-sulphonic acid are in each case introduced through the charge inlets 5c with the aid of metering screw conveyors. The resultant dispersions containing 26.5 percent by weight of the pigment are homogeneous and non-viscous, and have a particle size with a diameter of less than $5\mu$.

What we claim is:

1. The method of preparing a dispersion having a finely divided state by suspending and subdividing a solid in a liquid medium in an enclosed system which comprises passing in continuously under pressure the solid being in a non-pumpable state and simultaneously the liquid medium in an agitated layer of spherical grinding elements having a particle diameter in the range of 0.3 to about 10 mm., passing thru said agitated layer the solid together with the liquid medium and separating continuously the formed dispersion from the grinding elements of said agitated layer.

2. The method of claim 1, wherein said solid being in a dry state.

3. The method of claim 1, wherein said separating being carried out with the aid of a sieve.

4. The method of preparing a dispersion having a finely divided state by suspending and subdividing a solid in a liquid medium in an enclosed system which comprises passing in continuously under pressure the solid being in a non-pumpable state and simultaneously the liquid medium in an agitated layer of spherical grinding elements having a particle diameter in the range of 0.3 to about 10 mm., passing thru said agitated layer the solid together with the liquid medium, the proportion by volume of said spherical grinding elements to the solid and the liquid medium being kept constant when passing thru the agitated layer.

5. The method of preparing a dispersion having a finely divided state by suspending and subdividing a solid in a liquid medium in an enclosed system which comprises passing in continuously under pressure the solid combined with the liquid medium in the form of a press cake in an agitated layer of spherical grinding elements having a particle diameter in the range of 0.3 to about 10 mm., passing thru said agitated layer the solid together with the liquid medium and separating continuously the formed dispersion from the grinding elements of said agitated layer.

6. The method of preparing a dispersion having a finely dvided state by suspending and subdividing a solid in a liquid medium in an enclosed system which comprises passing in continuously under pressure the solid being in a non-pumpable state and simultaneously the liquid medium in an agitated layer of spherical grinding elements having a particle diameter in the range of 0.3 to about 10 mm., passing thru said agitated layer the solid together with the liquid medium and separating continuously the formed dispersion from the grinding elements of said agitated layer, said passing in being carried out in the presence of a surface active agent.

7. The method of claim 6, wherein said surface active agent being introduced with the liquid medium containing said surface active agent.

8. The method of claim 6, wherein said surface active agent being introduced separately and simultaneously with the solid and the liquid medium being in the form of a press cake.

9. The method of claim 6, wherein said surface active agent being introduced with the dry solid containing the dry surface active agent.

10. The method of claim 6, wherein said surface active agent is the sodium salt of dinaphthyl-methane-2,2′-disulfonic acid.

11. The method of claim 1, wherein said spherical grinding elements are glass beads having a diameter of 0.4 to 0.8 mm.

No references cited.

WILLIAM W. DYER, JR., *Primary Examiner.*

G. A. DOST, *Assistant Examiner.*